March 23, 1971 J. A. GREAVES ETAL 3,572,236
TEA DISPENSING MACHINE
Filed Nov. 5, 1968

United States Patent Office 3,572,236
Patented Mar. 23, 1971

3,572,236
TEA DISPENSING MACHINE
John Alfred Greaves, Dudley, and Trevor David Illman, Warley, England, assignors to Fisholow Products Limited, Tipton, England
Filed Nov. 5, 1968, Ser. No. 773,449
Int. Cl. A47j 31/00
U.S. Cl. 99—289                          6 Claims

ABSTRACT OF THE DISCLOSURE

A tea dispensing machine which includes a receiver containing a filter element, means for delivering tea leaves and hot water to said receiver when it is in an upright position, means for inverting the receiver after the tea flavouring has been absorbed by the hot water which passes to a delivery station and means for applying an impact to the inverted receiver to dislodge spent tea leaves from the filter element. The receiver is then returned to its original upright position.

BACKGROUND OF THE INVENTION

Field of the invention

This invention relates to coin operated vending machines which include the facility for dispensing tea.

Description of the prior art

In most coin-operated tea dispensing machines the beverage is obtained by dissolving powdered "instant" tea in hot water as opposed to obtaining the beverage by an infusion process. As a result of this the flavour of tea from a vending machine has not been the same as that which one gets when the tea is made in a teapot from tea leaves and there is thus a degree of resistance to the use of vending machines for dispensing tea.

Numerous attempts have been made in the past to provide a coin-operated vending machine which can dispense tea made by an infusion process from tea leaves but not entirely satisfactory method has yet been devised for disposing of the spent tea leaves. One previous proposal has included a planar filter element into which the tea leaves were delivered and, after hot water had been passed through the tea leaves, relative movement was effected between the filter element and a scraper to scrape the tea leaves from the filter. This arrangement suffered from the disadvantage that some tea leaves remained adhered to the scraper whilst others were forced through the mesh of the filter on relative movement between the filter and the scraper.

It is accordingly an object of the present invention to provide an improved form of tea dispensing machine which includes means for "dumping" the spent tea leaves.

SUMMARY OF THE INVENTION

The present invention provides a tea dispensing machine which includes a receptacle for receiving tea leaves, the receptacle including a filter element, means being provided for supporting the receptacle in a normal position in which, in use, it receives tea leaves and hot water from a delivery mechanism, the hot water and tea flavouring absorbed thereby passing to a delivery station and the tea leaves being arrested by the filter element; means being provided for rotating the receptacle to an inverted position and means being provided for moving the receptacle downwardly and applying an impact to the receptacle when it is in its inverted position whereby any tea leaves adhering to the filter element are dislodged therefrom and pass to a disposal station, said means for effecting rotation of the receptacle including a shaft driven by an electric motor and a drive connection between the shaft and the receptacle such as to permit the receptacle to move vertically relative to the shaft.

DESCRIPTION OF THE PREFERRED EMBODIMENT

Figure 1:
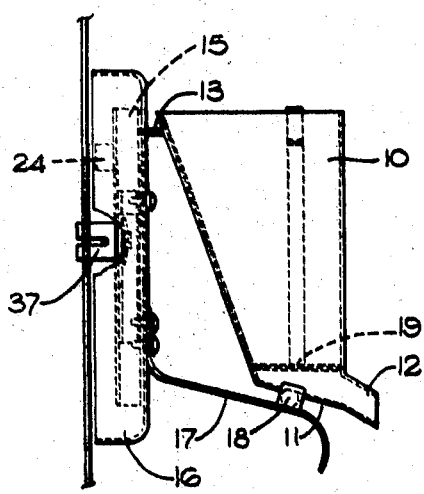
FIG. 1 is a part-sectional view of part of the tea dispensing mechanism for a vending machine.
Figure 2:
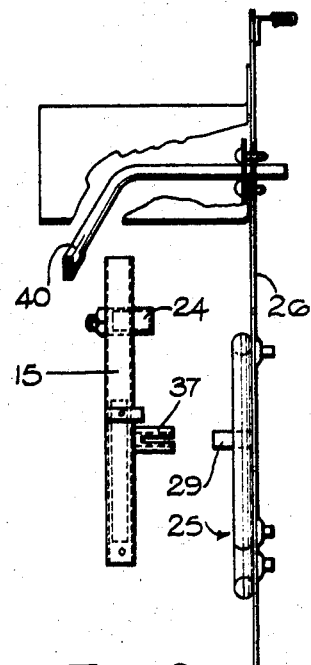
FIG. 2 is a further detail view of the tea dispensing mechanism showing two parts thereof separated.

The tea brewing and tea leaf disposal means of the present invention are applicable to a coin-operated vending machine which is designed for dispensing tea either as the only beverage available from the machine or as one of a number of beverages which can be obtained from the machine. Whether the machine is a tea-only machine or a multiple beverage machine, the machine will include a commodity selection mechanism whereby a customer can choose, for example, tea with milk and sugar, tea without milk but with sugar, tea with milk but without sugar or tea without milk or sugar. The machine is preferably of the post-selection type, i.e. the appropriate coinage for obtaining the beverage is first inserted and then a button or other selector mechanism is operated to set in operation the appropriate delivery mechanism or mechanisms of the vending machine.

The machine preferably includes a timer motor for controlling a vending cycle of operations of the machine, the commodity selection mechanism, means rendered effective upon the insertion of the appropriate value of coinage into the machine to cause the timer motor to operate through a part of a cycle of operation and means rendered effective upon actuation of the commodity selection mechanism for causing the timer motor to operate through the remainder of the cycle. A vending machine having such a control system is described and claimed in U.S. patent specification No. 3,249,196 to which reference should be had for details of the control system.

The machine includes a number of dry beverage indredient cannisters each of which includes a dispensing mechanism arranged to be rotated by a predetermined amount to deliver the required amount of the dry ingredients when the appropriate element or elements of the commodity selection mechanism is or are operated and, for a tea-only dispensing machine, the ingredient cannisters will consist of a tea leaf cannister, a dried milk cannister and a sugar cannister. The machine includes a boiler for providing hot water and the hot water delivery circuit is arranged so that, on initiation of a vending cycle of operations of the machine, hot water passes to a mixing chamber into which the milk and/or sugar are delivered and the timing of the water, sugar and milk delivery mechanism is such that the water is supplied to the mixing chamber before any of the milk or sugar and continues to be supplied for some time after the milk and sugar have been delivered. From the mixing chamber the hot water containing the appropriate ingredients passes along a pipe to a delivery station to which a cup has previously been fed by a cup delivering mechanism.

The boiler is preferably constructed and arranged to operate with the water therein close to boiling, being fitted with an imersion heater and there being a vent outlet extending from the top of the boiler, which outlet contains a thermostatic control element controlling operation of the immersion heater whereby the water in the boiler is maintained in use very close to 210° F.

There are two pumps associated with the boiler and the pumps are energized through contacts closed by the timer motor of the machine and one of the pumps is arranged to deliver twice as much hot water from the boiler as the other. This first pump delivers its water to the tea brewing system whereas the other pump delivers its lesser volume of water, via a heat exchanger in which said volume of water is cooled, to the mixing chamber which receives the dried milk and sugar so that the temperature of the beverages delivered to the customer is reduced compared with that obtaining in the boiler, the high temperature water delivered from the boiler to the tea brewing system resulting in the quality of the tea obtained from this high temperature water being a considerable improvement compared with that which one obtains when the tea is infused using water obtained from a boiler which is maintained at a temperature within the range of from 190° to 200° F.

The tea brewing mechanism of the machine includes a stainless steel vessel 10 of somewhat cylindrical form, the vessel 10 being open at the top which is of larger diameter than the base 11 and the base 11 being inclined as can be seen from FIG. 1. There is a downwardly inclined outlet spout 12 leading from the interior of the vessel 10 in communication with the lowest part of the base of the vessel. There can be a cap (not shown) threaded onto the end of the outlet spout, the spout and cap being formed each with a D-saped opening and the cap being rotatable on the spout to vary the degree of registry of the two openings whereby the size of the outlet opening can be varied and the rate of flow of liquid from the vessel 10 can be regulated as required.

At the top of the vessel 10 there is a bracket 13 located diametrically opposite to the outlet spout 12 and the bracket 13 includes an upstanding leg which is arranged to be inserted in an opening 14 in a carrier member 15. The carrier member 15 is of plate-like form and is located within a somewhat dish-shaped cover 16, there being a leaf spring 17 attached to the carrier member 15 and the leaf spring 17 carrying a seat 18 which is arranged to receive a projection extending downwardly from the base 11 of the vessel 10 so that when it is desired to attach the vessel 10 to the carrier member 15 it is necessary merely to insert the upstanding lug of the bracket 13 in the opening 14 of the carrier member 15 and then located the projection on the base of the vessel 10 in the seat 18 carried by the leaf spring 17 and the vessel 10 is then mounted resiliently in position on the carrier member 15.

The vessel 10 receives a filter element 19 which consists of a disc-like mesh 20 which is a close fit in the lower portion of the vessel 10 and there are a pair of resilient arms 21 attached to the mesh 20, each of the resilient arms 21 having a projection 22 adjacent its free end whereby the upper ends of the arms are spaced from the side walls of the vessel so that, when it is desired to remove the filter element 19 from the vessel 10 for sterilization, and cleaning purposes, this can readily be effected.

Figure 5:
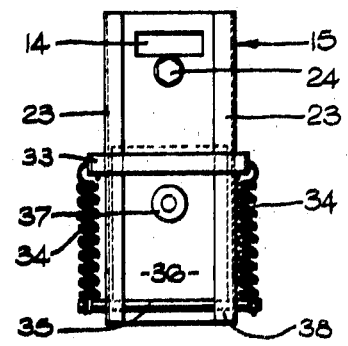

The carrier member 15 is of generally rectangular form and the side edges thereof are bent upwardly and then inwardly to afford inwardly directed flanges 23 shown in FIG. 5. Adjacent the opening 14 the carrier member 15 is provided with a cam follower in the form of a roller 24 which is of generally cylindrical form and is arranged with its longitudinal axis at right angles to the plane of the plate of the carrier member 15. The roller 24 is arranged to engage a cam track 25 carried by a plate 26 within the machine, the cam track 25 including a part-circular portion 27 and a part-helical portion 28, the centre of curvature of the part-circular portion 27 lying on the axis of a drive shaft 29 which is driven by a driving motor of the machine and the radial distance between the part-helical portion 28 and said axis 29 decreases from the free end 30 thereof to the other end which is contiguous with the part-circular portion 27, there being a recess 31 at the junction between the part-helical p ortion 28 and the part circular portion 27 and the arrangement is such that, when the vessel 10 is in its vertical state, the roller 24 of the carrier member 15 is located in said recess 31 and, as the vessel 10 rotates from its vertical normal in use position the roller 24 moves along the part-circular portion 27 to the free end 32 thereof.

A rod 35 is attached to the side flanges 23 of the carrier member 15 and a pair of helical springs 34 act between the rod 35 and a bar 33 which is attached to a plate 36 which is located in face-to-face engagement with the plate of the carrier member 15 and with the side edges thereof located in the channels afforded by the flanges 23. The plate 36 carries a bush 37 which is arranged to fit over the shaft 29 and to be secured to the shaft 29 by means of screws (not shown) whereby, when the shaft 29 is rotated, the plate 36 is also rotated and hence the carrier member 15 together with the vessel 10 is caused to rotate.

The carrier member 15 is arranged so that it can slide relative to the plate 36 in the direction of its axis of elongation, i.e. in a vertical direction as viewed in FIG. 5, such sliding movement of the carrier member 15 being effected under the action of the springs 34 which are tension springs and which serve to urge the roller 24 into engagement with the inside surface of the cam track 25.

Figure 3:
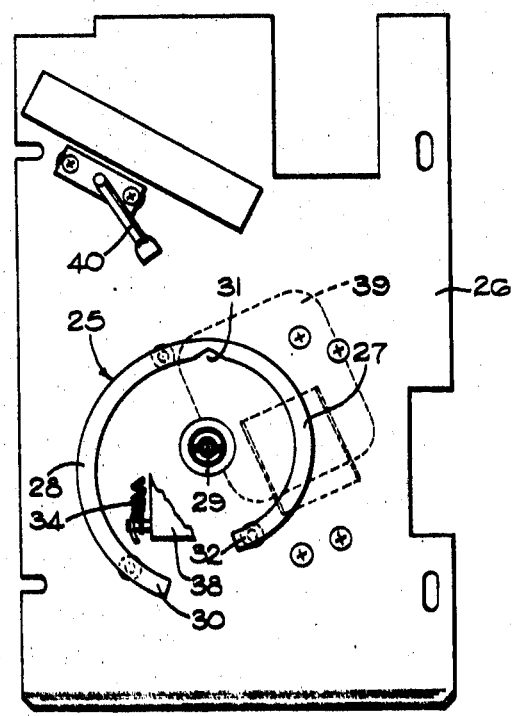
FIG. 3 is a detail view showing a cam mechanism carried by a vertical plate within the machine.
Figure 4:
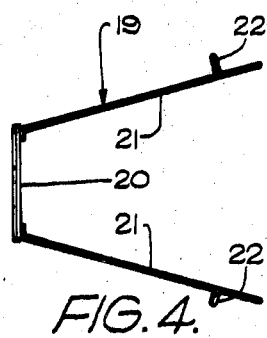
FIG. 4 is a view of a filter element for insertion in a vessel forming part of the tea-dispensing mechanism, the filter element serving to filter the tea and retaining spent tea leaves thereon and,
FIG. 5 is a view showing spring means operative to apply an impact to dislodge spent tea leaves from the filter element.

For convenience one corner 38 of the carrier member 15 and a portion of the associated spring 34 have been shown in FIG. 3 and the arrangement is such that, on rotation of the plate 36 the bar 33 moves about the axis of the shaft 29 at a fixed distance therefrom and the springs 34 acting between the rod 35 and the bar 33 contiuously urge the roller 24 into engagement with the inside of the cam track 25. When the vessel 10 is rotated on transmission of drive to the shaft 29 the roller 24 moves along the part-circular portion 27 of the cam track 25 until the roller 24 comes to the free end 32 of the track portion 27. The carrier member 15 is then free to move relative to the plate 36 under the action of the springs 34 and the vessel 10 is, by this time, in a substantially inverted position and the carrier member 15 and with it the vessel 10 thus move rapidly downwardly under the action of the springs 34 until further movement of the carrier member 15 is limited by its engagement with the cover member 16 and the impact obtaind on the carrier member 15 striking the flange of the cover member 16 causes tea leaves retained in the filter element 19 to be dislodged therefrom and the tea leaves, fall from the filter element to a disposal station, such as a bucket. On continued rotation of the plate 36 and henc also the carrier member 15 and vessel 10, the roller 24 engages the free end 30 of the part-helical portion 28 of the cam track 25 and the carrier member 15 is then progressively moved in a radial direction relative to the axis of drive shaft 29 during continued rotation thereof so that, by the time that the vessel 10 has returned to its normal vertical position, the carrier member 15 is in its original starting position and the roller 24 then engages in the recess 31. The motor 39 which is shown in outline in FIG. 3 and which serves to drive the shaft 29 can be arranged so that, when the roller 24 moves into the recess 31, a microswitch is operated so as to cause the motor 39 to stop so that only one rotation of the vessel 10 is permitted in any one vending cycle of operations.

In operation of the vending machine, tea leaves are dispensed from the tea leaf cannister and fall into the open top of the vessel 10. At the same time hot water is fed into the top of the vessel 10 through a delivery pipe 40 and infusion takes place at the bottom of the vessel 10, the hot water and its absorbed flavoring passing through the filter element 19 into the bottom portion of the vessel 10 and out through the outlet pipe 12 to a delivery nozzle (not shown) and thence to a delivery station of the machine. The amount of water supplied to the vessel 10 for the infusion process is, as pointed out above, greater than the amount of water supplied to the milk/sugar mixing chamber since solution of the milk and sugar can take place in the cup and the water flow paths for the tea leaves and for the milk and/or sugar are separate, there being two delivery nozzles at the delivery station, one leading from the vessel 10 and the other from the milk/sugar mixing chamber. In an alternative arrangement the hot water and absorbed tea flavoring from the vessel 10 are arranged so that they pass from the outlet spout 12 to the milk/sugar mixing chamber and thence to the delivery station.

After the valves supplying hot water to the vessel 10 and to the milk/sugar mixing chamber have been closed, the electric motor 39 drives the shaft 29 to rotate the plate 36 and hence also the carrier member 15 and the vessel 10. When the vessel has been rotated through about 170° the roller 24 is clear of the cam track 25 and the vessel moves rapidly downwardly and, on termination of the downward movement, which is under the action of the springs 34, an impact is applied to the vessel 10 which causes the tea leaves to be dislodged from the filter element 19, the spent tea leaves being dumped in a bucket or the like from which they are periodically removed. Further rotation of the shaft 29 results in the vessel 10 being returned to its original position.

From the above it can be seen that the present invention provides a simple and effective arrangement whereby, at the end of a tea dispensing cycle of operations of a vending machine, the spent tea leaves adhering to a filter element are caused to become dislodgd from the filter element by applying an impact to the vessel containing the filter element.

We claim:

1. A tea dispensing machine which includes a receptable for receiving tea leaves, the receptacle including a filter element, means being provided for supporting the receptacle in a normal position in which, in use, it receives tea leaves and hot water from a delivery mechanism, the hot water and tea flavoring absorbed thereby passing to a delivery station and the tea leaves being arrested by the filter element, means operable to rotate the receptacle to an inverted position and means being provided for moving the receptacle downwardly and applying an impact to the receptacle when it is in its inverted position whereby any tea leaves adhering to the filter element are dislodged therefrom and pass to a disposal station, said means for effecting rotation of the receptacle including a shaft driven by an electric motor and a drive connection between the shaft and the receptacle such as to permit the receptacle to move vertically relative to the shaft.

2. A machine according to claim 1 in which the impact-applying means is such that said downward movement is abruptly terminated, the termination of such downward movement providing the impact.

3. A machine according to claim 1 in which the impact-applying means includes a cam follower spring-loaded into engagement with a cam track, said cam follower being fixed, in use, relative to the receptacle and being arranged to disengage from said cam track when the receptacle is in its inverted position.

4. A machine according to claim 1 in which the receptacle comprises a generally cylindrical vessel containing the filter element, the filter element being removable from the vessel and the vessel having an inclined base and an outlet leading from the lowest portion of said base.

5. A machine according to claim 1 in which said drive connection includes a pair of slidingly co-operable members having spring-loading means acting therebetween, the receptacle being mounted on one of said members and the other of said members being attached to said shaft, said members being arranged to rotate together about the axis of said shaft.

6. A machine according to claim 5 in which said impact applying means includes a cam follower carried by said one member, said cam follower being spring-loaded, by virtue of the spring loading between said members, into contact with a cam track, said cam track being formed with a discontinuity such that, when the receptacle is in its inverted position, the cam follower disengages from the cam track and said receptacle is urged downwardly relative to said shaft to receive said impact.

References Cited

UNITED STATES PATENTS

| | | | |
|---|---|---|---|
| 3,338,153 | 8/1967 | Holstein | 99—289 |
| 3,390,626 | 7/1968 | Holstein | 99—289X |
| 3,446,137 | 5/1969 | Pryor | 99—289 |

ROBERT W. JENKINS, Primary Examiner

U.S. Cl. X.R.

222—197